United States Patent [19]
Michener

[11] 3,774,686
[45] Nov. 27, 1973

[54] DOUBLE BARRELED APPARATUS FOR CLEARING LAND

[76] Inventor: Lynn H. Michener, Vernonia, Oreg.

[22] Filed: Dec. 22, 1971

[21] Appl. No.: 211,073

Related U.S. Application Data

[63] Continuation of Ser. No. 61,432, Aug. 5, 1970, abandoned.

[52] U.S. Cl. ................... 172/26.5, 172/771, 37/2 R
[51] Int. Cl. ............................................. E02f 3/60
[58] Field of Search .................. 172/23, 26.6, 26.5, 172/61, 64, 261, 264, 262, 237, 618, 771; 37/2, 54, 71, 115–117

[56] References Cited
UNITED STATES PATENTS

| | | | |
|---|---|---|---|
| 1,280,011 | 9/1918 | Garrott | 172/23 |
| 1,324,937 | 12/1919 | Smith | 172/23 |
| 2,990,632 | 7/1961 | Noblin | 37/2 R |
| 3,445,945 | 5/1969 | Howell | 172/26.5 |
| 3,065,802 | 11/1962 | Nikkel | 172/64 |
| 364,780 | 6/1887 | Shepard | 172/26.5 |
| 1,824,989 | 9/1931 | Fundom | 37/117 |
| 3,467,199 | 9/1969 | Lowery | 172/261 |
| 2,857,690 | 10/1958 | Yake et al | 37/2 R |
| 846,678 | 3/1907 | Bagley | 172/26.5 |
| 3,034,238 | 5/1962 | McGee | 172/777 |
| 2,187,262 | 1/1940 | Brown | 172/237 |
| 1,760,840 | 5/1930 | Enard | 37/115 |

FOREIGN PATENTS OR APPLICATIONS
928,076    11/1947   France ................... 172/23

*Primary Examiner*—Edgar S. Burr
*Assistant Examiner*—Eugene H. Eickholt
*Attorney*—Kolisch and Hartwell

[57] ABSTRACT

A method and apparatus for clearing sloping, dry land terrain for tree growing purposes. A pair of stations are located on the terrain with one at a different elevation and spaced generally along the slope of the terrain from the other. A ground-working implement is dragged between the stations along the slope of the terrain. With such dragging, the implement roughly clears a shallow groove in the dirt forming the exterior of such terrain, which groove extends generally along the slope of the terrain. Further, with such dragging, periodically the continuity of such groove is broken whereby water barriers are produced along the length of the groove. The ground-working implement preferably comprises an implement body including a pair of generally parallel containers secured side-by-side in the implement body, the containers producing a pair of such grooves simultaneously on the implement being dragged, with such grooves separated by a narrow rise where topsoil tends to collect and predominate.

2 Claims, 5 Drawing Figures

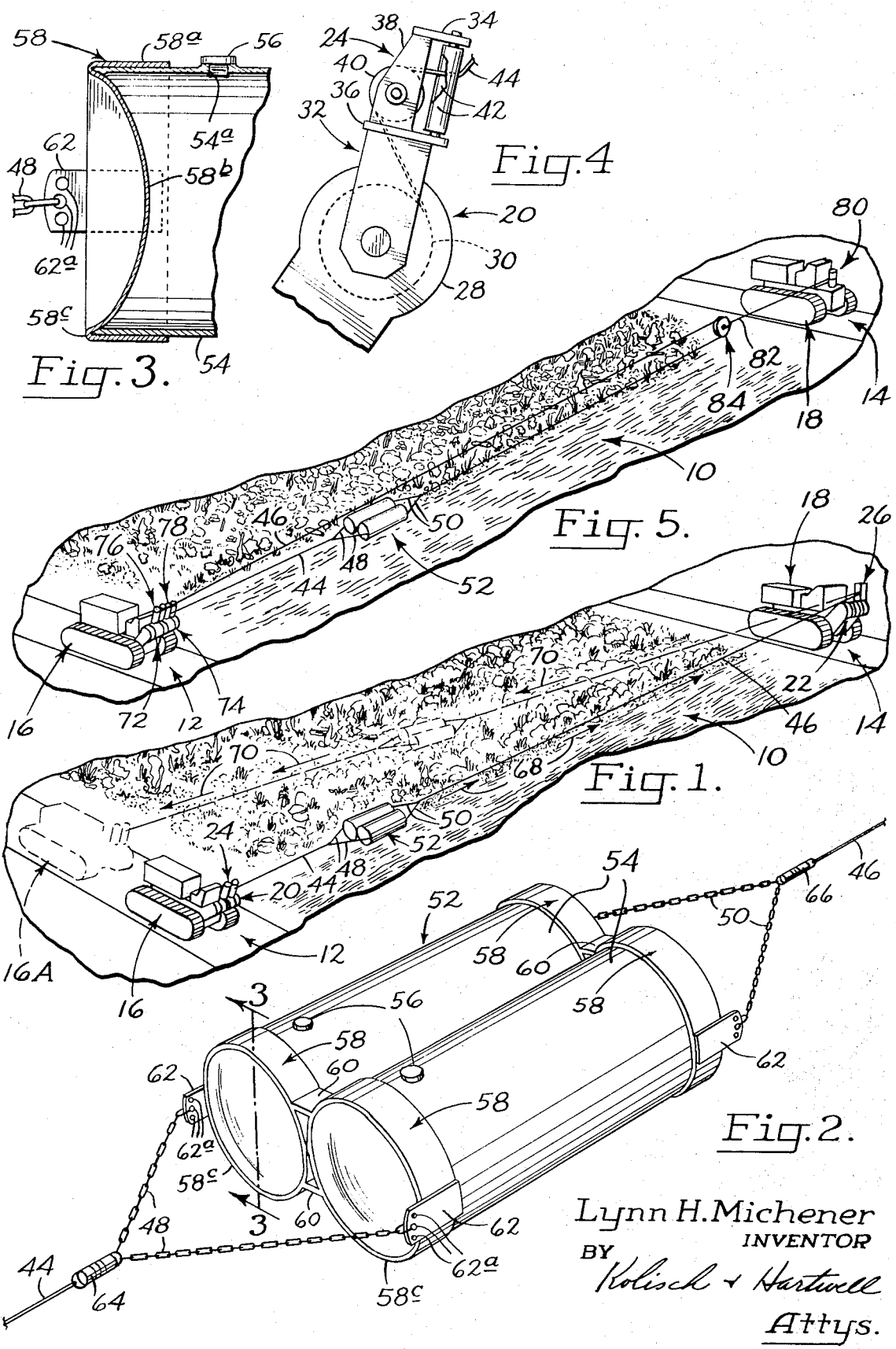

DOUBLE BARRELED APPARATUS FOR CLEARING LAND

This is a continuation, of application Ser. No. 61,432, now abandoned, filed Aug. 5, 1970.

This invention relates to a method and apparatus for clearing a sloping, dry land terrain, and is a continuation of an application filed May 24, 1968, having Ser. No. 731,776 now abandoned.

In the clearing of land for the purpose of reforestation, it has been customary to employ a tractor with a dozer blade which, on traveling over the ground, clears it of brush, stumps, snags, and other ground cover. While the practice has been satisfactory in fairly flat terrain, it has been relatively costly, and unsatisfactory for a number of other reasons, in rugged, steeply sloped terrain. In the latter type of region, wear and tear on the tractor becomes excessive, and in some cases it is difficult if not impossible even to maneuver the tractor.

A general object of the invention is to provide a novel method and apparatus for clearing sloping land terrain, which enables such to be done both economically, and in a manner which is highly satisfactory for the fast growth of trees.

More particularly, the invention concerns such a method and apparatus, wherein a movable ground-working shuttle implement is dragged along the slope of the terrain. Dragging is produced by means of lines which extend from the implement to devices such as tractors stationed with one at a higher elevation than the other on the terrain being cleared. In practice, the implement is moved back and forth over the land between the tractors, and after each pass of the implement, one of the tractors may be advanced to a new location to enable the implement on a subsequent pass to move over a region of the terrain immediately adjacent the region just cleared.

Various objects and advantages attained by the invention will become more fully apparent as the description which follows is read in conjunction with the accompanying drawings, wherein:

FIG. 1 is a fragmentary perspective view, illustrating a preferred embodiment of the invention, and showing how such may be used in preparing a hillside for the planting of trees in a reforestation project;

FIG. 2 is an enlarged perspective view illustrating further details of a shuttle implement employed in the apparatus shown in FIG. 1;

FIG. 3 is a fragmentary, cross-sectional view, on a larger scale than FIG. 2, illustrating details of construction of the implement of FIG. 2;

FIG. 4 is an enlarged, fragmentary side elevation, illustrating a winch and associated training mechanism employed in the apparatus of FIG. 1; and FIG. 5 is a view, similar to FIG. 1, but illustrating a somewhat modified way of practicing the invention.

Turning now to the drawings, and referring first to FIG. 1, indicated generally at 10 is part of a hillside which is to be cleared for reforestation purposes. Extending along the side of the hillside, along courses which are relatively level, i.e., horizontal, or across the slope of the hill, are roads 12, 14, which may take the form of the usual logging access roads provided in many forest areas. Road 14 is located upwardly on the side of hill from road 12, i.e., at a higher elevation than road 12.

Positioned on roads 12, 14 are a pair of tractors, or vehicles, 16, 18. As best illustrated in FIG. 1, the tractors are at different elevations with tractor 18 being spaced upwardly on the slope of the terrain and above tractor 16 which is below it on the hillside. Suitably mounted on the rear ends of the frames in tractors 16, 18 are power-driven winches, or power-operated means 20, 22, respectively, and training mechanism, or guides, 24, 26, respectively, disposed above the winches.

The respective winches and training mechanisms may be substantially the same in construction. Thus, and considering FIG. 4, winch 20 includes a pair of laterally-spaced frame members, such as member 28, joined to the frame in tractor 16, and a power-driven drum 30 journaled on and extending between frame members 28. Mechanism 24 comprises a frame 32 suitably anchored to and projecting above frame members 28. Frame 32 includes a pair of vertically spaced, upwardly facing plates, 34, 36 and a pair of laterally spaced, upright plates, such as plate 38, extending between and joining plates 34, 36. Journaled on and extending between plates 34, 36 are a pair of upright, laterally spaced rollers 42.

Referring to FIGS. 1 and 4 together, at 44 is a flexible cable, or reach of line, having an end wound on drum 30 in winch 20, and extending from such end over drum 40 and between rollers 42 in mechanism 24. A similar cable 46 has an end wound on the drum in winch 22 with the cable extending from such end outwardly through training mechanism 26. The exposed ends of cables 44, 46 are connected (in a manner which will be more fully described) through chains indicated generally at 48, 50, respectively, to opposite ends of an elongated ground-working implement 52.

Considering FIGS. 2 and 3, implement 52 comprises a body including a pair of elongated, hollow cylinders, or containers, 54 disposed in side-by-side parallel relation. Each cylinder includes a port, such as port 54a (FIG. 3), through which water may be introduced into the cylinder, with such ports closed off normally by plugs 56. Closing off opposite ends of each cylinder is a fitting 58 joined as by welding to the cylinder. Each fitting includes a cylindrical part 58a seated snugly about the outside of an end of a cylinder, and a central part 58b which joins with part 58a and which has a concave outwardly-facing surface. Where parts 58a, 58b join, there is provided a relatively sharp, axially outwardly facing circular edge 58c, the lower part of which in FIGS. 2 and 3 constitutes a ground-working edge, or ground-working means, in the implement. The two cylinders are joined together for movement as a unit by means of plates 60 extending between and welded to adjacent pairs of fittings 58 in the implement.

Provided at each end, of the implement body is bracket structure in the form of a pair of brackets 62 anchored as by welding to the cylindrical parts in fittings 58. In the preferred embodiment illustrated, each bracket is provied with a set of three vertically spaced bores, such as bores 62a. Previously mentioned chain 48 has its opposite ends suitably connected to the pair of brackets provided adjacent the left end of implement 52 in FIG. 2. More specifically, such ends of the chain are shown connected through clevises to the central bores in these brackets. The chain midway between its ends is joined through a connector 64 to cable 44. Chain 50 has its opposite ends suitably connected through the central bores in the brackets provided at the other end of the implement. A central part of chain 50 is joined through a connector 66 to cable 46.

Explaining now how the apparatus so far described is employed in clearing an expanse of hillside 10, initially water may be introduced into containers 54 in order to give implement 52 the desired overall weight. With tractors 16, 18 occupying one set of positions or stations on roads 12, 14, such as the positions in which they are shown in solid outline in FIG. 1, and with implement 52 initially placed closely adjacent tractor 16, winch 22 may be operated to take up cable 46, with the implement then moving over the ground in the direction of arrows 68. Cable 44 pays out from the drum in winch 20. Implement 52 is moved by dragging it toward tractor 18, and during such dragging the ground-working edges thereon which face tractor 18 dig into the ground and remove stumps, brush and other material.

When the implement has moved to a position closely adjacent tractor 18, tractor 16 is advanced on road 12 to a new position such as the one where it is shown in dashed outline, at 16A. With tractor 16 in this new position, winch 20 is operated to take up cable 44, with cable 46 then being payed out from winch 22. Implement 52 then moves over the ground toward tractor 16 in the direction of arrows 70 and, with such movement of the implement, the ground-working edges facing tractor 16 clear the strip of land over which the implement moves.

When implement 52 has arrived at a position adjacent tractor 16, tractor 18 may then be advanced to a new position or station on road 14, by moving it to the left in FIG. 1. The various steps just described may then be repeated whereby all the land which is desired to be cleared is suitably processed. After processing, and using the apparatus and method of the invention, roughly cleared elongated strips extend back and forth over the expanse of terrain, with these strips extending generally in a direction along or following the slope of the terrain, which is to say down the slope of the terrain with such strips viewed from road 14. These strips may be planted with trees in a reforestation project.

It should be pointed out here that in a reforestation project, trees are planted some distance apart from each other, and there is no requirement that all the ground in a given area be completely cleared to permit reforestation to take place. Growth is suitably promoted if regions are provided in the immediate vicinity of each planted tree cleared of competing growth. Once the trees have become established, the trees on growing gradually crowd out remaining growth that may have been left in the clearing project.

In obtaining harvestable timber in the shortest amount of time, it is important that young trees on being planted quickly become established in good soil, so that over immediately succeeding years maximum grwoth takes place. A young seedling properly planted in cleared topsoil can reach a size in five years which far exceeds that size obtained where conditions are not so carefully controlled. The implement of the invention has been found to produce primarily a brush and root clearing action, without appreciable digging up of the dirt or topsoil in the area being cleared, an important factor in promoting fast initial growth.

Describing in more detail the functioning of the implement disclosed, because of the presence of the two elongated hollow cylinders 54 which extend longitudinally and are arranged side-by-side in the implement, a tendency of the implement to move laterally as by rolling on itself is inhibited. Because of the presence of the two cylinders, on the implement being dragged along the terrain, and by reason of the end profile of the implement as best seen in FIG. 2, the roughly cleared strip resulting actually comprises two shallow grooves disposed side-by-side. A narrow rise or ridge extends between these grooves, which forms generally directly beneath plates 60 in the implement, midway between the two cylinder bodies in the implement. This rise or ridge normally will include a large portion of fertile topsoil from the area cleared, and may serve as a good place for the planting of seedlings.

Referring now to FIG. 5, according to a modified form of the invention, the frame in tractor 16 carries a pair of power-driven winches 72, 74 (which are similar to winches 20, 22) supporting training mechanisms, or guides, 76, 78 respectively (which are similar to mechanisms 24, 26). Mounted on the rear of the frame in tractor 18, through a suitable mount 80 and a cable 82 secured to the mount, is a pulley-block, or guide, 84.

Cable 44 in this case has an end wound on the drum in winch 74 with the cable extending through mechanism 78 to chain 48. Cable 46, on the other hand, has an end wound on the drum in winch 72 with the cable then extending through mechanism 76, over the pulley in block 84, to chain 50.

With such modified apparatus, clearing of an expanse of land takes place in much the same manner as that earlier described. Here, however, shuttle movement of implement 52 results from alternately operating winches 72, 74 which are carried on the same tractor.

Thus, clearing of an expanse of land, using the present invention, can be accomplished in a relatively simple manner regardless of the type of terrain involved. Vehicles employed need not maneuver up and down steep hills or into dense ground cover, but can instead travel along relatively level paths. Thus, wear and tear on vehicles in minimized.

It should be noted that chains 48, 50 are connected to opposite ends of implement 52, at points spaced some distance above the base of the implement 52. On being dragged over the ground, it is the bottom portions of edges 58c which actually dig into the ground and produce the clearing. On such implement being dragged into a root or other obstruction which impedes forward progress, and because of the connection of the chains to the implement at points spaced well above these bottom portions of these edges, the implement will tend to stand on end with the trailing end of the implement swinging up into the air. This movement of the implement permits it to free itself, whereby on moving past the obstruction its trailing edge may drop down with the implement then assuming its normal horizontal position. With the implement shifting to its on-end position, there is, of course, a tendency for any material lodged within the concave faces of the implement to be dumped or discharged, and a clearing action takes place.

As indicated, with the bottom edges 58c of the implement doing the clearing, and on dragging of the implement, two shallow grooves are formed which extend in the path that the implement takes on moving along the sloping terrain. When the implement stands on end, as a result of meeting a certain resistance in the ground being worked, the digging action of the implement is interrupted, and the continuity of the grooves being prepared by the implement is obviously broken. Material collecting in the concave faces of the lead end of the implement on being dumped forms a deposit on the ground, also serving to break the continuity of the grooves.

In practicing the method of the invention, wherein periodically the implement stands on end, this interruption of the grooves normally prepared by the implement is important in the control of erosion. Further explaining, the implement is pulled or dragged along the slope of the terrain being cleared, as in this way its progress over the terrain is best controlled. The implement, therefore, and were it to cut continuous grooves, would provide channels or paths for water flow which could introduce a serious erosion problem. The digging interruption, with the deposit of accumulated material periodically, produces what might be referred to as water barriers at points along such grooves, inhibiting such unrestricted water flow.

By providing a series of bores 62a in the brackets 62, the distance between the bottom of the implement and the actual points of connection of the ends of the chain to the implement may be altered, whereby the reaction force caused by the element striking an obstruction necessary to introduce upending of the implement may be adjusted.

While a preferred embodiment and a modification of the invention have been described herein, it is appreciated that variations and modifications may be made without departing from the spirit of the invention. Accordingly, it is desired to cover all such variations and modifications which would be apparent to those skilled in the art and that come within the scope of the appended claims.

It is claimed and desired to secure by Letters Patent:

1. Apparatus for clearing land comprising
a shuttle implement including a body formed of first and second elongated containers disposed with said containers side-by-side in said body, said containers having one set of ends forming one end of said body and an opposite set of ends forming an opposite end in said body, said two containers being rigidly secured together as a unit in said body for movement in a common direction, ground-working edge means at each end of each container for engaging and scraping the ground, first bracket structure secured to the implement body at one end of said body spaced above said ground-working edge means at said one end of said body, second bracket structure secured to the implement body at the opposite end of said body spaced above said ground-working edge means at said opposite end of said body, and
a pair of flexible reaches of line extending in opposite directions away from said implement body, one of said reaches being connected to said first bracket structure at one end of said body and the other of said reaches being connected to said second bracket structure and at the opposite end of said body.

2. Apparatus as claimed in claim 1, wherein said ground-working edge means are formed by inwardly curved members closing the ends of each of the containers.

* * * * *